United States Patent
Russell et al.

(10) Patent No.: US 8,167,120 B2
(45) Date of Patent: May 1, 2012

(54) LATERAL LOAD BUILDING CONVEYOR APPARATUS

(75) Inventors: Achie B. Russell, Connersville, IN (US);
Christopher Harris, Fishers, IN (US);
Sean Finley, Indianapolis, IN (US);
Donald West, Indianapolis, IN (US)

(73) Assignee: Systec Corporation, Indianapolis, IN (US)

( * ) Notice: Subject to any disclaimer, the term of this patent is extended or adjusted under 35 U.S.C. 154(b) by 123 days.

(21) Appl. No.: 12/564,805

(22) Filed: Sep. 22, 2009

(65) Prior Publication Data

US 2010/0072026 A1    Mar. 25, 2010

Related U.S. Application Data

(60) Provisional application No. 61/099,085, filed on Sep. 22, 2008.

(51) Int. Cl.
*B65G 43/08* (2006.01)
(52) U.S. Cl. .......... 198/809; 198/817; 198/370.09; 198/370.1; 198/457.03; 198/597
(58) Field of Classification Search ............ 198/809, 198/370.09, 370.1, 457.02, 457.03, 597, 198/817
See application file for complete search history.

(56) References Cited

U.S. PATENT DOCUMENTS

| 4,019,623 | A | * | 4/1977 | Tassi et al. ............... 198/370.1 |
| 4,456,116 | A | * | 6/1984 | Jarman ..................... 198/414 |
| 4,730,718 | A | * | 3/1988 | Fazio et al. ............... 198/370.1 |
| 4,962,841 | A | * | 10/1990 | Kloosterhouse ......... 198/370.09 |
| 5,145,049 | A | * | 9/1992 | McClurkin ................ 198/374 |
| 5,220,994 | A | * | 6/1993 | Jenkner .................... 198/445 |
| 5,609,236 | A | * | 3/1997 | Neukam .................. 198/370.1 |
| 6,360,869 | B1 | * | 3/2002 | Itoh et al. ................. 198/370.1 |
| 6,694,220 | B1 | * | 2/2004 | Tanz ........................... 700/226 |
| 6,907,978 | B2 | * | 6/2005 | Evans et al. ............. 198/370.09 |
| 7,090,067 | B2 | * | 8/2006 | Schiesser et al. ............ 198/395 |
| 2002/0134545 | A1 | * | 9/2002 | Cho et al. ................... 165/289 |
| 2004/0226803 | A1 | * | 11/2004 | Brixius et al. ............. 198/370.1 |

FOREIGN PATENT DOCUMENTS

JP         62157120 A   *   7/1987   ............. 198/457.03

* cited by examiner

*Primary Examiner* — Mark A Deuble
(74) *Attorney, Agent, or Firm* — Maginot, Moore & Beck, LLP (57) ABSTRACT

A load moving apparatus is operable to move a load, such as a stack of sheet product, in a first and second direction on a staging area. The load moving apparatus includes a first conveyor, a second conveyor, and a translating device. The first conveyor defines the staging area and is configured to move a load in a first direction. The second conveyor is positioned within the staging area and is configured to move the load in a second direction different from the first direction. The translating device is configured to move vertically one of the first conveyor and the second conveyor relative to the other of the first conveyor and the second conveyor. The load moving apparatus can be used to build or break down loads entering the staging area.

21 Claims, 11 Drawing Sheets

LATERAL LOAD BUILDING CONVEYOR APPARATUS

This application claims priority of U.S. Provisional Application Ser. No. 61/099,085, filed Sep. 22, 2008, entitled Lateral Loading Building Conveyor Apparatus, the disclosure of which is hereby incorporated by reference in its entirety.

BACKGROUND

The present invention relates to the field of conveyors and especially conveyors for transferring stacks of sheets.

Conveyors play a critical role in the packaging and transport of sheet products, such as corrugated sheet material. Conveyors carry the newly manufactured sheet to various stations where stacks of sheets are formed and eventually loaded onto pallets for shipment. In order to optimize control over the sheets and stacks of sheets, many conveyors incorporate powered drive rollers to propel and direct the product.

In many cases, the nature of the product being conveyed may change, which ultimately may modify the transport requirements. For instance, in the corrugated sheet industry, the size of the corrugated panels may change from job to job. Regardless of the size of the corrugated panels, most jobs have similar packaging and transport requirements—i.e., the corrugated sheets are stacked to a predetermined height and loaded onto pallets. The step of loading the stacks onto pallets is relatively straightforward when the size of the sheets in the stack is roughly equal to the size of the pallet. When the corrugated sheets are smaller, however, multiple stacks are loaded onto a single pallet. This scenario complicates the manner in which the stacks are transferred and a given pallet load is built.

Further complicating the process is high production speeds. High throughput challenges the design of the conveyor system, particularly when the stacks must be manipulated or diverted along different paths in the process.

What is needed, therefore, is a conveyor apparatus that is adaptable to handle a wide range of products, while able to perform reliably under high throughput conditions.

SUMMARY

A load moving apparatus has been developed configured to move a load, such as a sheet product, in a first and second direction across a staging area. The load moving apparatus includes a first conveyor, a second conveyor, and a translating device. The first conveyor is coupled to a frame and is configured to define a staging area. The first conveyor is configured to move a load in a first direction. The second conveyor is positioned within the staging area and is configured to move the load in a second direction different from the first direction. The translating device is configured to move vertically one of the first conveyor and the second conveyor relative to the other of the first conveyor and the second conveyor.

A method of arranging a load upon a staging area includes activating a first conveyor to move a first portion of a load in a first direction onto a staging area. The method also includes activating a second conveyor to move the first portion of the load in a second direction on the staging area. The second direction is non-collinear with and may be perpendicular to the first direction. The method also includes activating the first conveyor to move a second portion of the load in the first direction onto the staging area, and then activating one of the first conveyor and the second conveyor to move the first portion of the load and the second portion of the load off the staging area, the load being arranged in a different configuration.

Another method of arranging a load upon a staging area includes activating a first conveyor to move a load in a first direction onto a staging area. The load is initially arranged in a first configuration. The method also includes lifting a first portion of the load above a load engaging surface of the first conveyor with a lifting device coupled to a second conveyor, and activating the first conveyor to move a second portion of the load in the first direction off the staging area. The method also includes activating the second conveyor to move the first portion of the load in a second direction, and activating the first conveyor to move the first portion of the load in the first direction off the staging area behind the second portion of the load. Upon being moved off the staging area the load is arranged in a second configuration.

DETAILED DESCRIPTION

For the purposes of promoting an understanding of the principles of the invention, reference will now be made to the embodiments illustrated in the drawings and described in the following written specification. It is understood that no limitation to the scope of the invention is thereby intended. It is further understood that the present invention includes any alterations and modifications to the illustrated embodiments and includes further applications of the principles of the invention as would normally occur to one skilled in the art to which this invention pertains.

Figure 1:
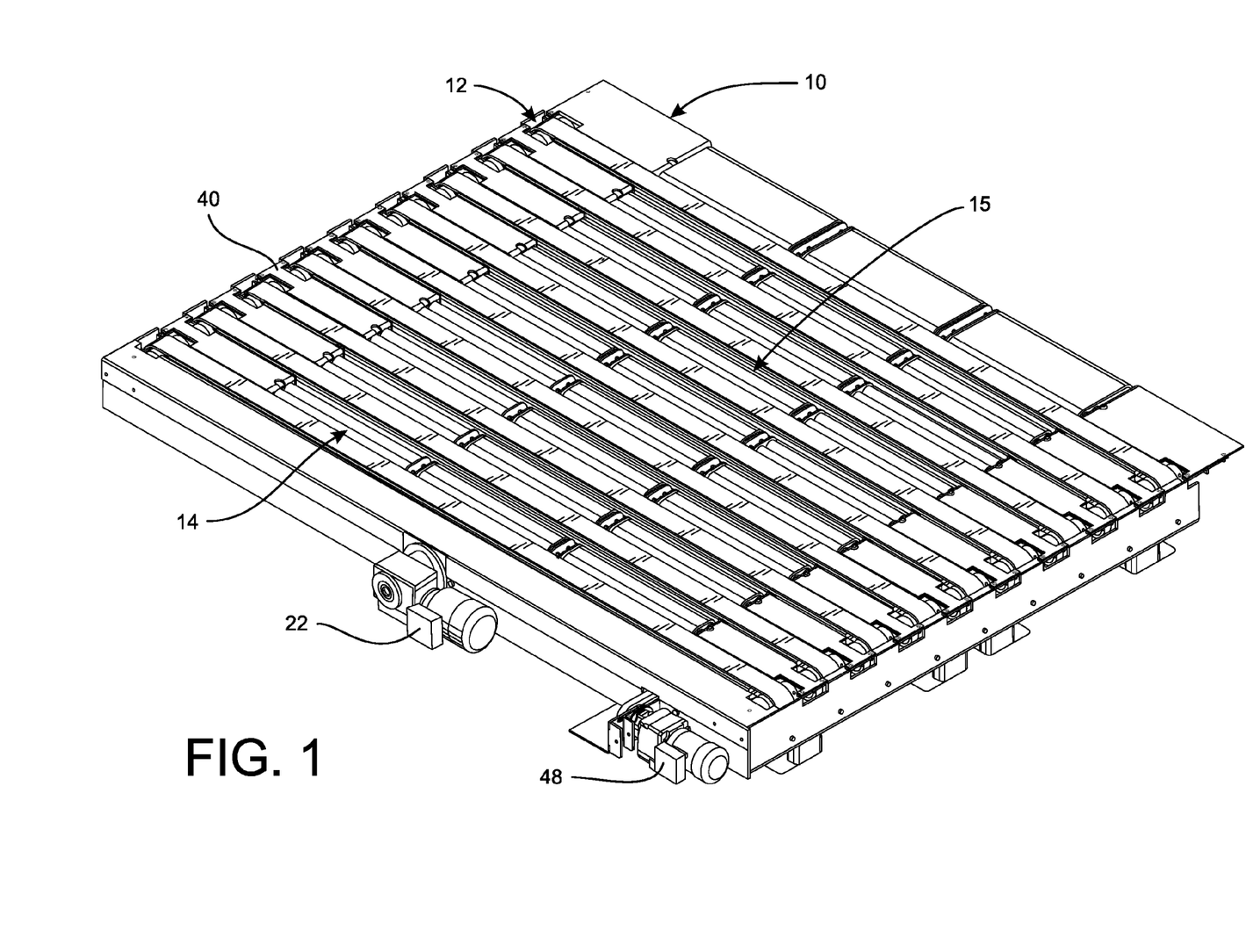
FIG. 1 is a top perspective view of a right angle conveyor section according to one embodiment disclosed herein.

A load moving apparatus referred to herein as a conveyor section 10 is of modular construction, as shown in FIG. 1. The conveyor section 10 includes a first directional component 12 and a second directional component 14 that can be removed and modified as required for a particular job. In one embodiment, the first directional component 12 is a conveyor component that receives product at a staging area 15 from an upstream conveyor. The second directional component 14 may also be a conveyor component configured to change the direction or orientation of the product received within the staging area 15. Furthermore, the second directional component 14 may also convey the product downstream for further processing.

Figure 2:
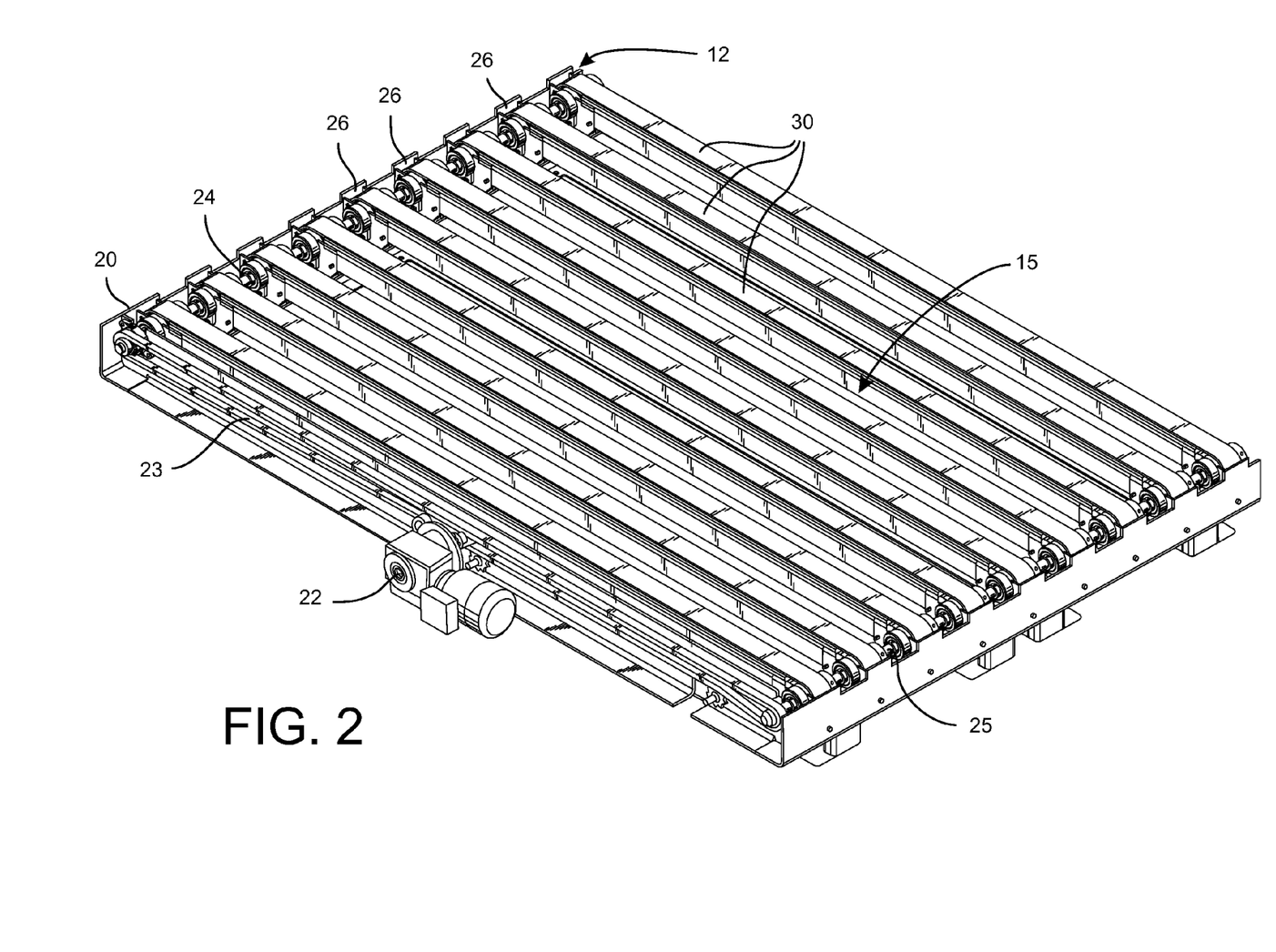
FIG. 2 is a top perspective view of a first directional component of the right angle conveyor section shown in FIG. 1.
Figure 3:
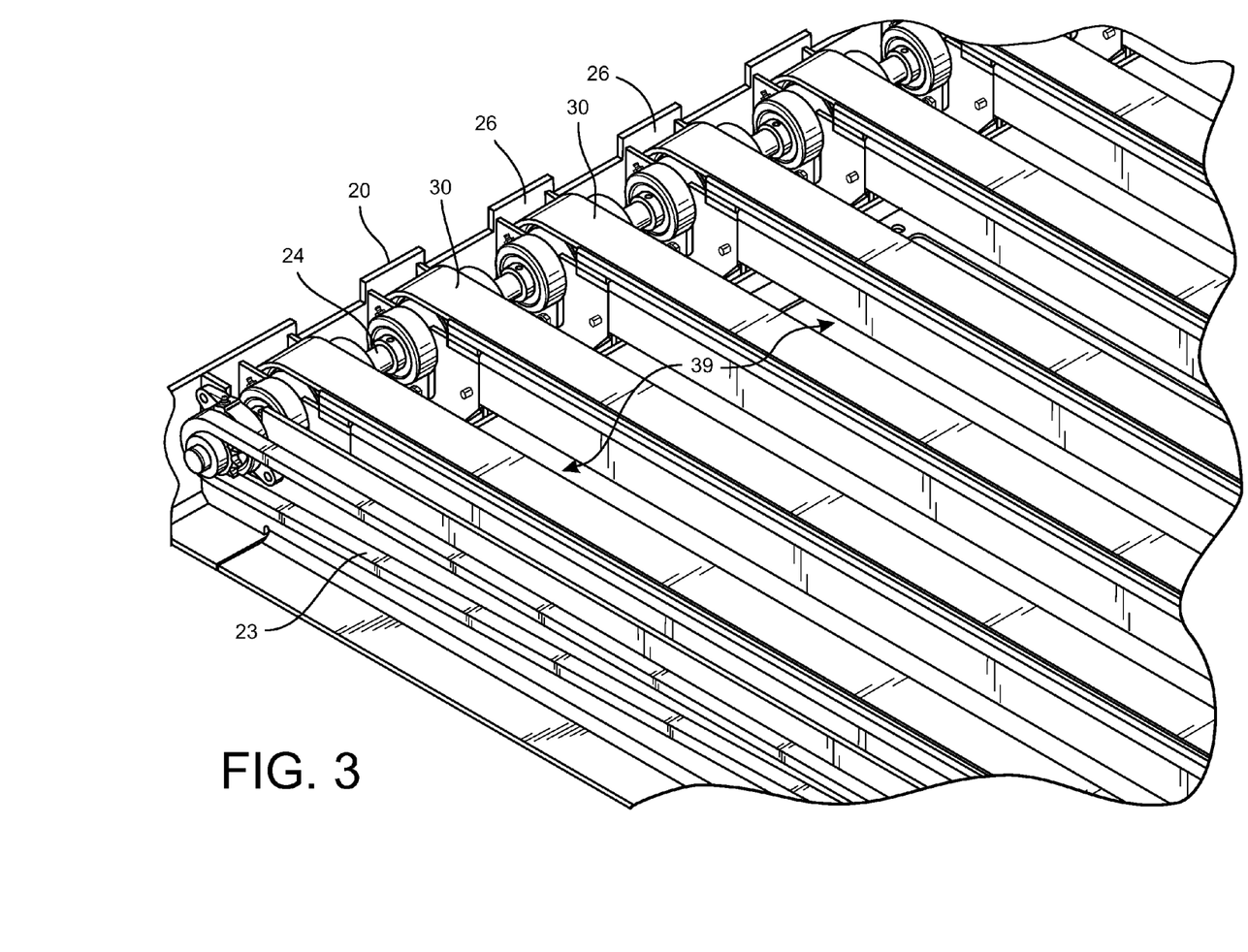
FIG. 3 is an enlarged view of one end of the first directional component shown in FIG. 2.
Figure 4:
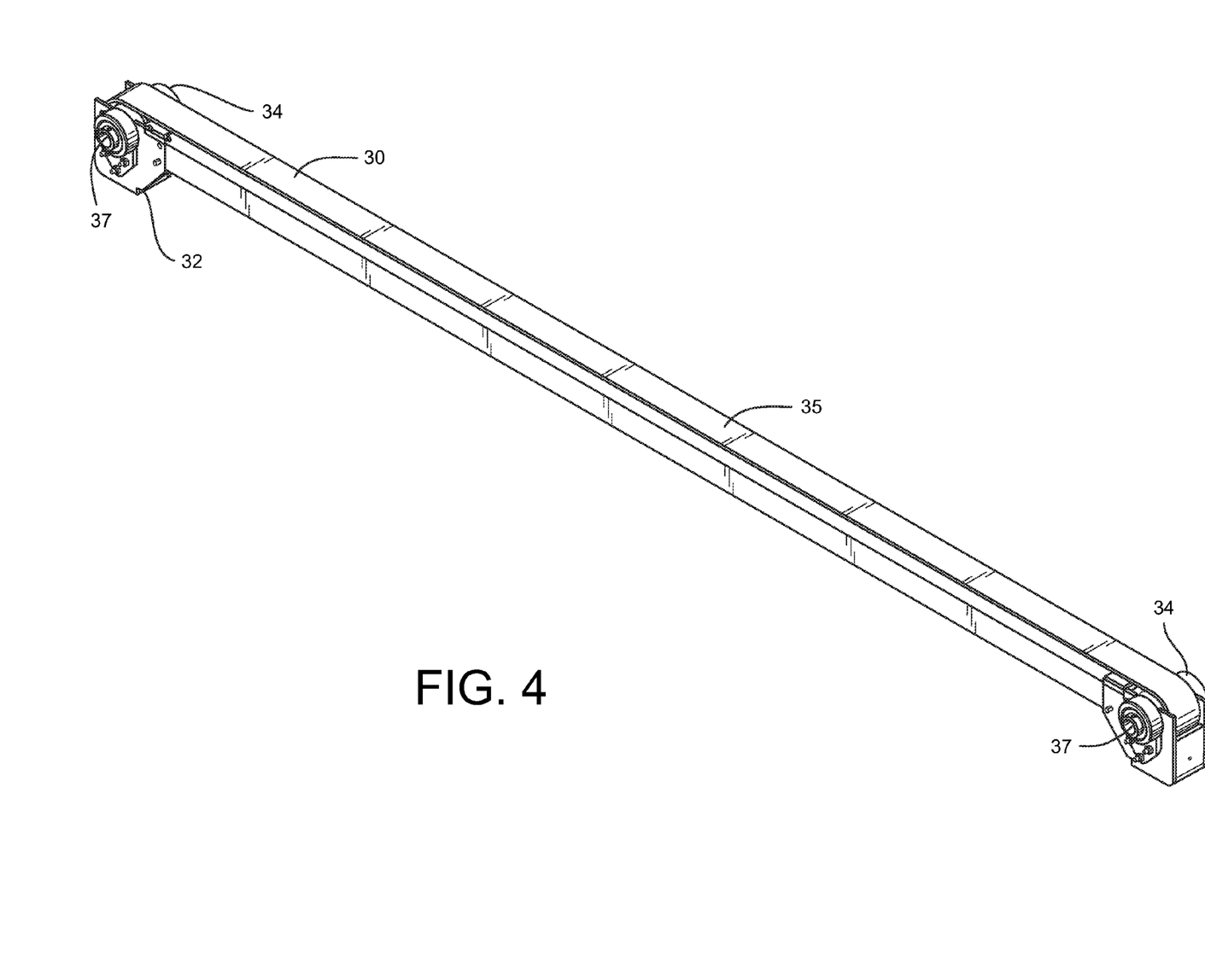
FIG. 4 is a perspective view of a removable element of the first directional component shown in FIG. 2.

Details of the first directional component 12 of the conveyor section 10 are shown in FIGS. 2-4. The component 12 includes a frame 20 that supports a drive motor 22. A drive belt 23 is connected between a front axle 24 and a rear axle 25. In the illustrated embodiment, the drive belt 23 spans the width of the frame 20. The motor 22 and drive belt 23 can be configured in a known manner to drive a plurality of rollers or belts. Drive mechanisms may be implemented that are capable of uniformly driving a plurality of individual moving elements, such as the belt elements 30. Other drive mechanisms may be implemented that are capable of individually driving a selected number of belt elements 30.

Details of a belt element 30 are shown in FIG. 4. The belt element 30 includes a frame 32 that is configured to drop into predetermined slots 26 (FIG. 3) defined in the frame 20. The frame 32 of a belt element 30 may be attached to the larger frame 20 in a conventional manner, such as by screws or bolts. The belt element 30 includes a drive spool 34 at each end of the frame 20 across which a belt 35 is stretched. The belt 35 is driven by rotation of the spools 34 in a conventional manner. The belt 35 includes a load engaging surface configured to contact a load upon the conveyor section 10. The spools 34 include a collar 37 that is adapted to receive one of the front axle 24 and rear axle 25 therethrough. Each collar 37 is configured to engage an axle 24, 25 so that the spools 34 rotate with the axles 24, 25. Thus, in a specific embodiment, each collar 37 may include a set screw that is tightened against the respective axle 24, 25.

The first directional component 14 may be modularly constructed with any number of belt elements 30. As shown in FIG. 2, the frame 20 includes nine slots 26 for receiving up to nine corresponding belt elements 30. Of course, the frame 20 may be configured with other numbers of slots 26. In accordance with one feature of the disclosed system, less than all of the slots 26 need be filled with a belt element 30.

Referring now to FIG. 3, the frame 20 for the first directional component 12 defines a series of open slots 39 interlaced between the slots 26 adapted to receive the belt elements 30. The open slots 39 provide access to the moving elements of the second directional component 14, referred to herein as roll elements 50, depicted in FIG. 1.

Figure 5:
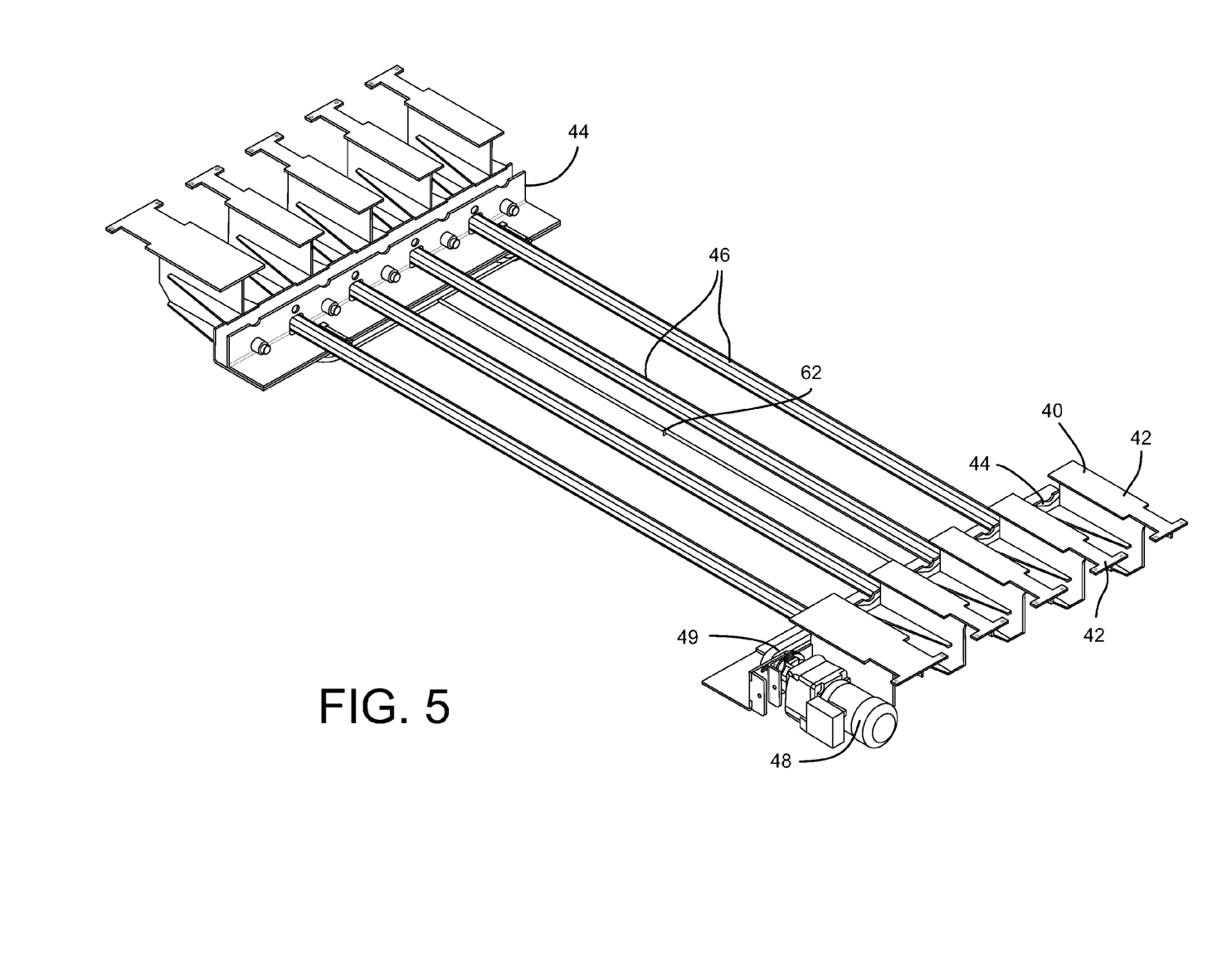
FIG. 5 is a top perspective view of a frame element for the second directional component of the right angle conveyor section shown in FIG. 1.

Referring now to FIG. 5, the second directional component 14 includes a frame 40 that includes cover plates 42 arranged to cover the axles 24, 25 extending across the width of the frame 20 for the first directional component 12. The frame 40 further includes opposite flange plates 44 for supporting a second conveyor element, such as the roll element 50 shown in FIGS. 6-7. The flange plates 44 are supported by longitudinal beams 46 so that the entire frame 40 may be integrated with the frame 20 to form the completed conveyor section 10. A drive motor 48 and drive belt 49 are supported by one of the flange plates 44.

The second directional component 14 includes a plurality of user-configurable roll elements 50. The roll element 50 shown in FIG. 6 includes a pair of belt conveyors 52 and an idler roller assembly 54. A common drive axle 56 terminates in a transfer drive assembly 58 (FIG. 7) that engages the drive belt 49 (FIG. 5). As illustrated the belt conveyors 52 have a width approximately equal to the space between the belt elements 30. The portion of the belt conveyor 52 that contacts the load is referred to herein as a load engaging surface of the belt conveyor 52. Similarly, the portion of the idler roller assembly 54 configured to contact a load is referred to herein as a load engaging surface of the idler roller assembly 54.

In one embodiment, all of the roll elements 50 are driven upon activation of the motor 48. Alternatively, the conveyor section 10 may include a drive mechanism capable of individually driving a selected number of roll elements 50.

Figure 6:
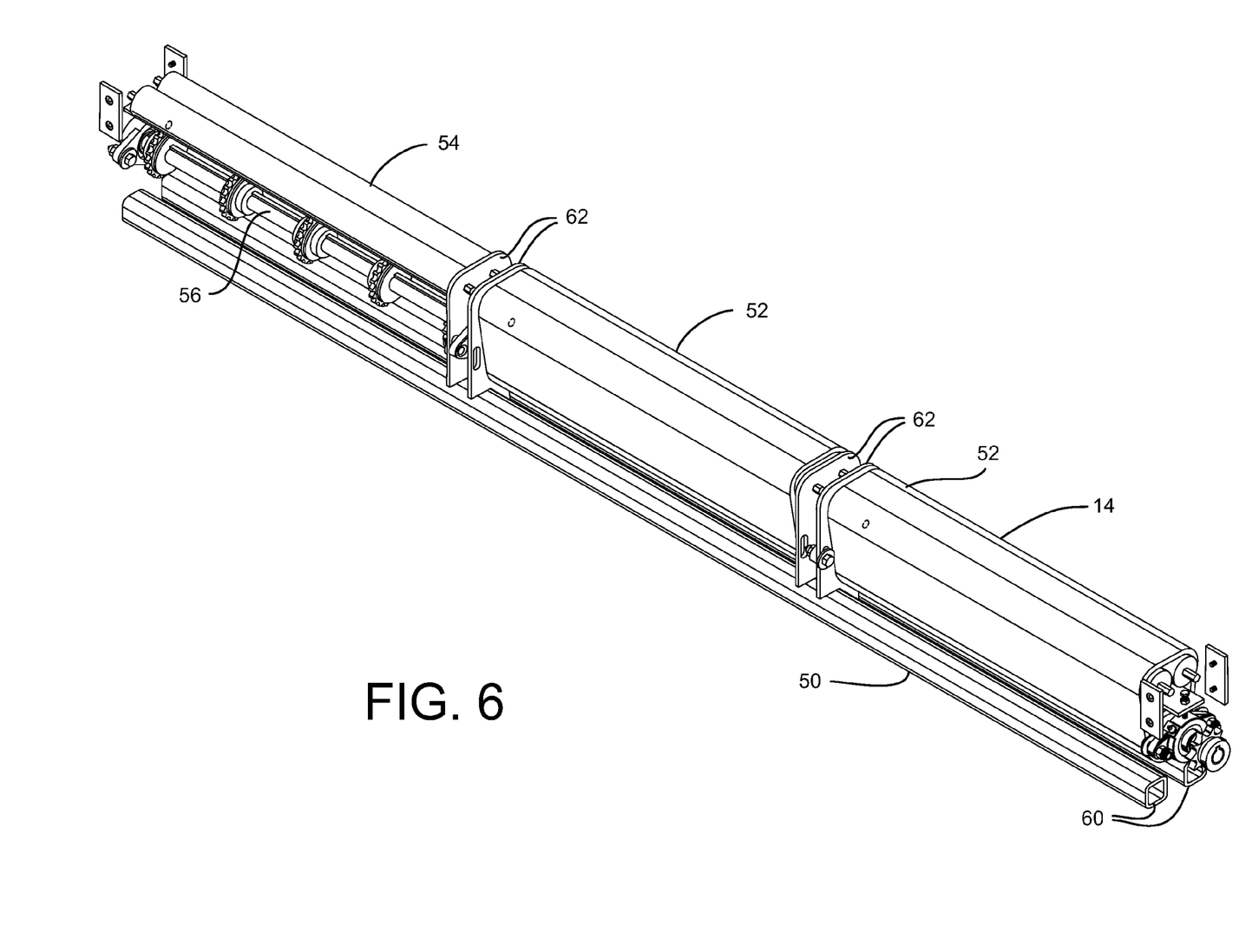
FIG. 6 is a perspective view of a removable element of a second directional component of the right angle conveyor section shown in FIG. 1.
Figure 7:
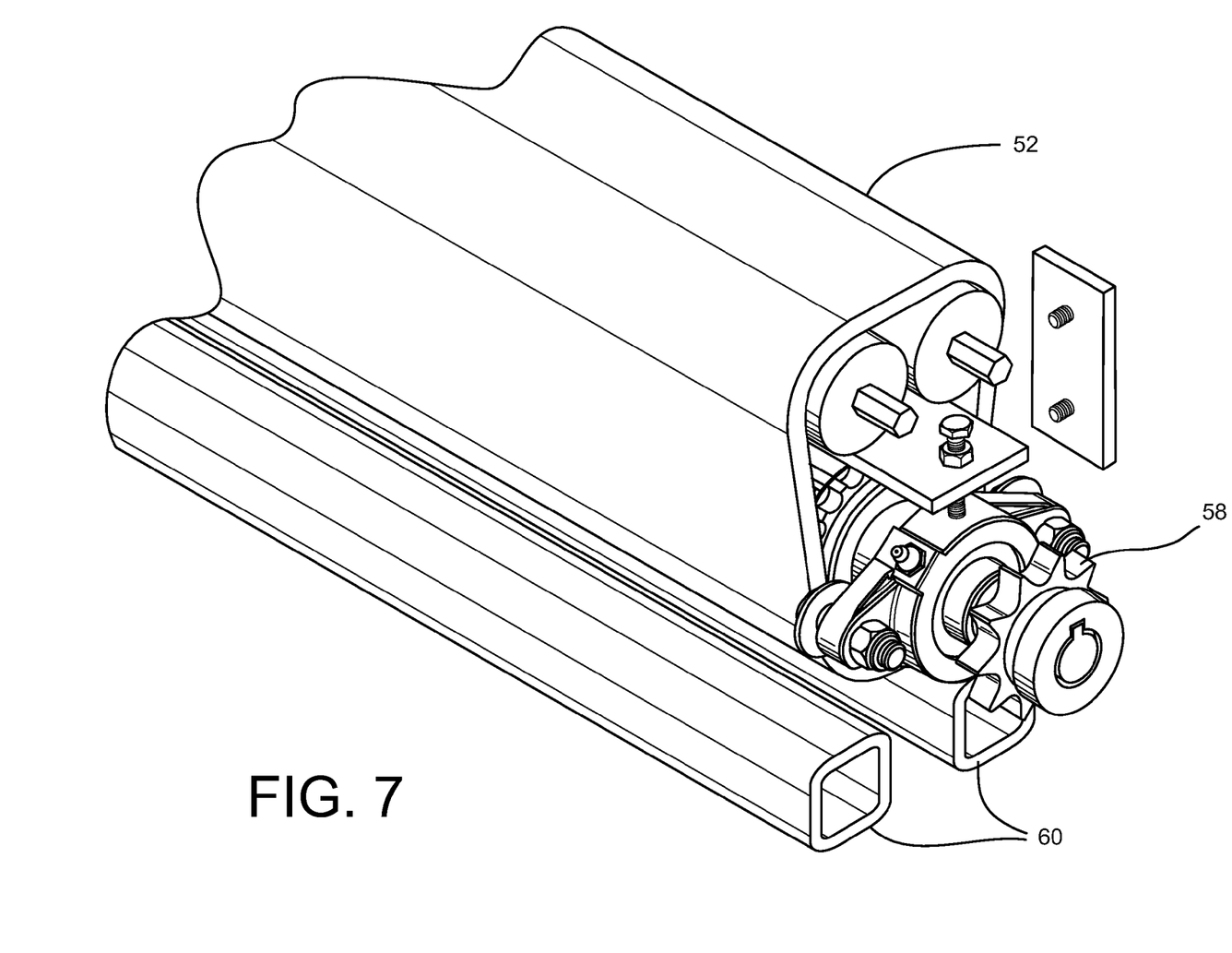
FIG. 7 is an enlarged view of one end of the removable element shown in FIG. 6.

As shown in FIG. 6, the roll elements 50 include support beams 60 that carry endplates 62 that support the conveyor components 52 and 54. The conveyor components 52, 54 may be modified for every configurable roll element 50. Thus, a given roll element 50 may include all idler rollers 54, all driven conveyors 52, or any combination of either component 52, 54.

Figure 8:
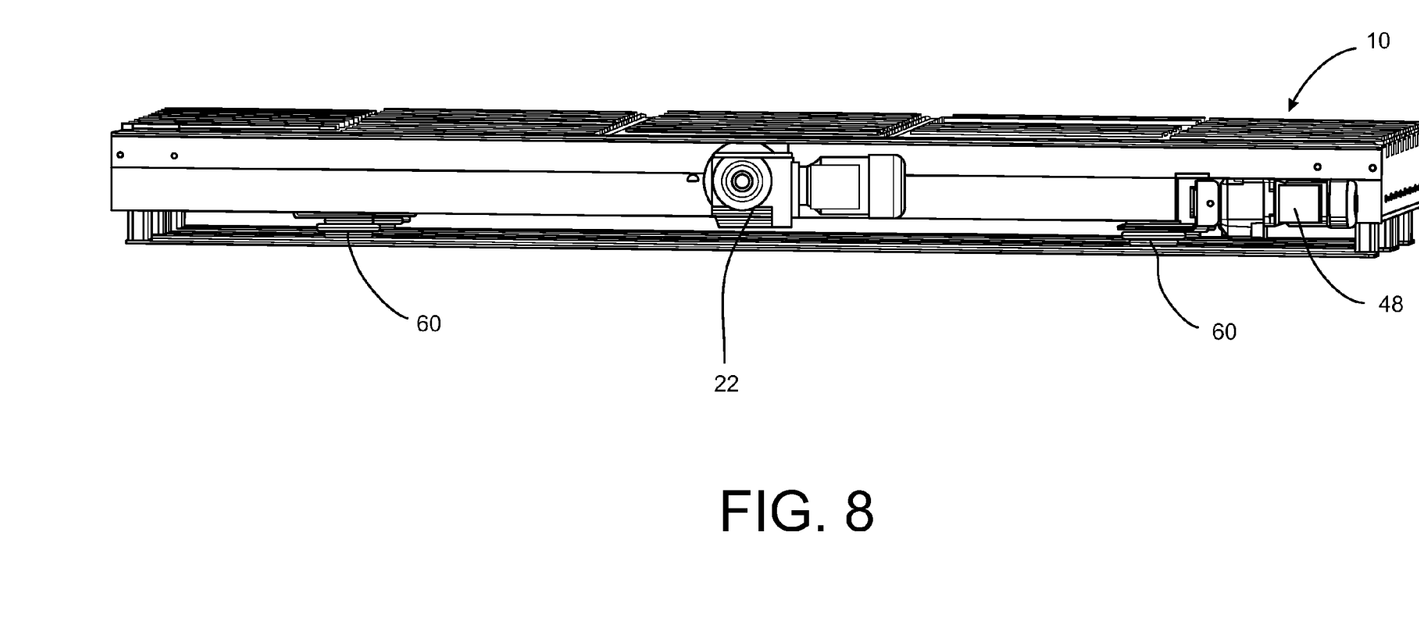
FIG. 8 is a side view of the right angle conveyor section shown in FIG. 1.
Figure 9:
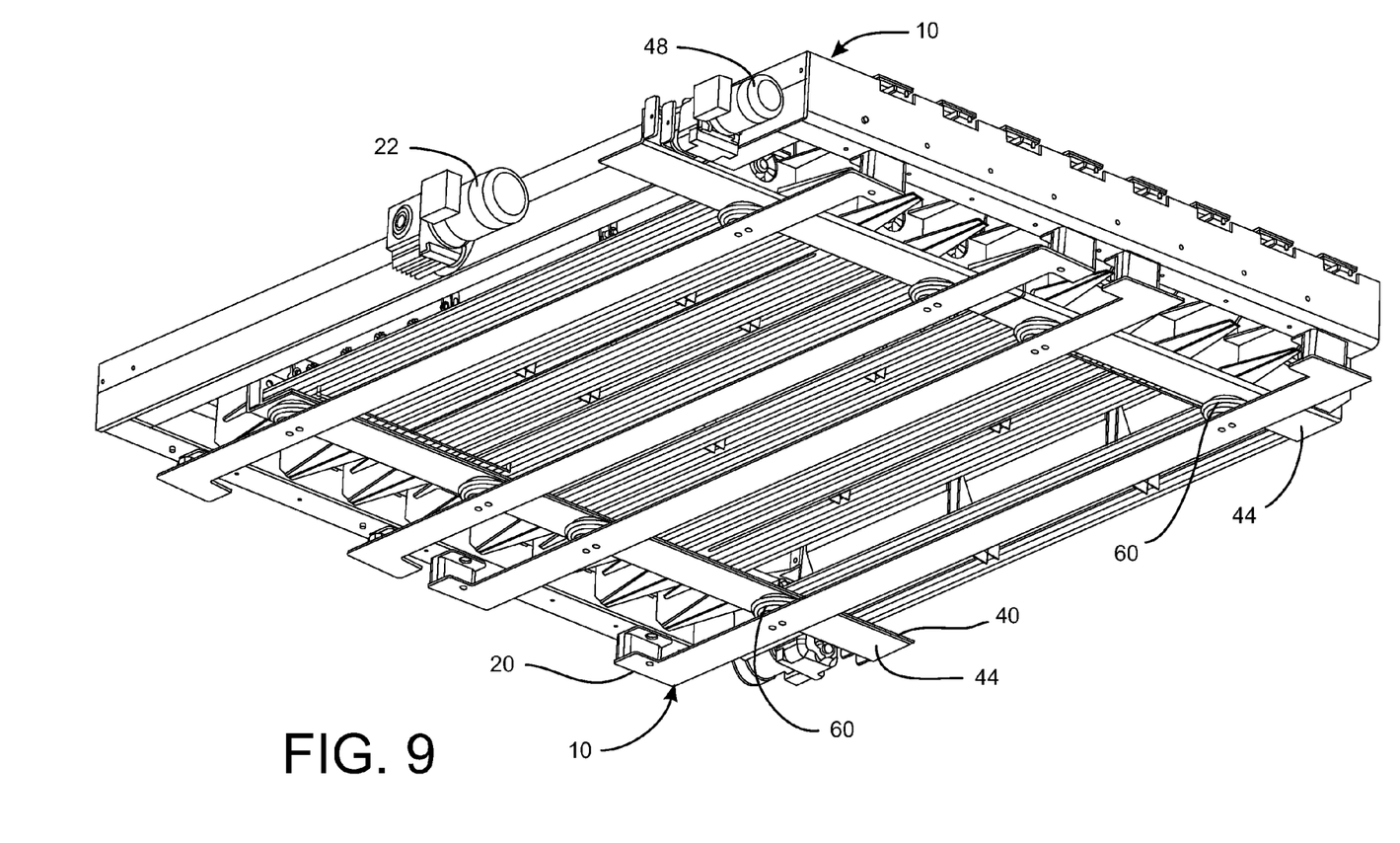
FIG. 9 is a bottom perspective view of the right angle conveyor section shown in FIG. 1.
Figure 10:
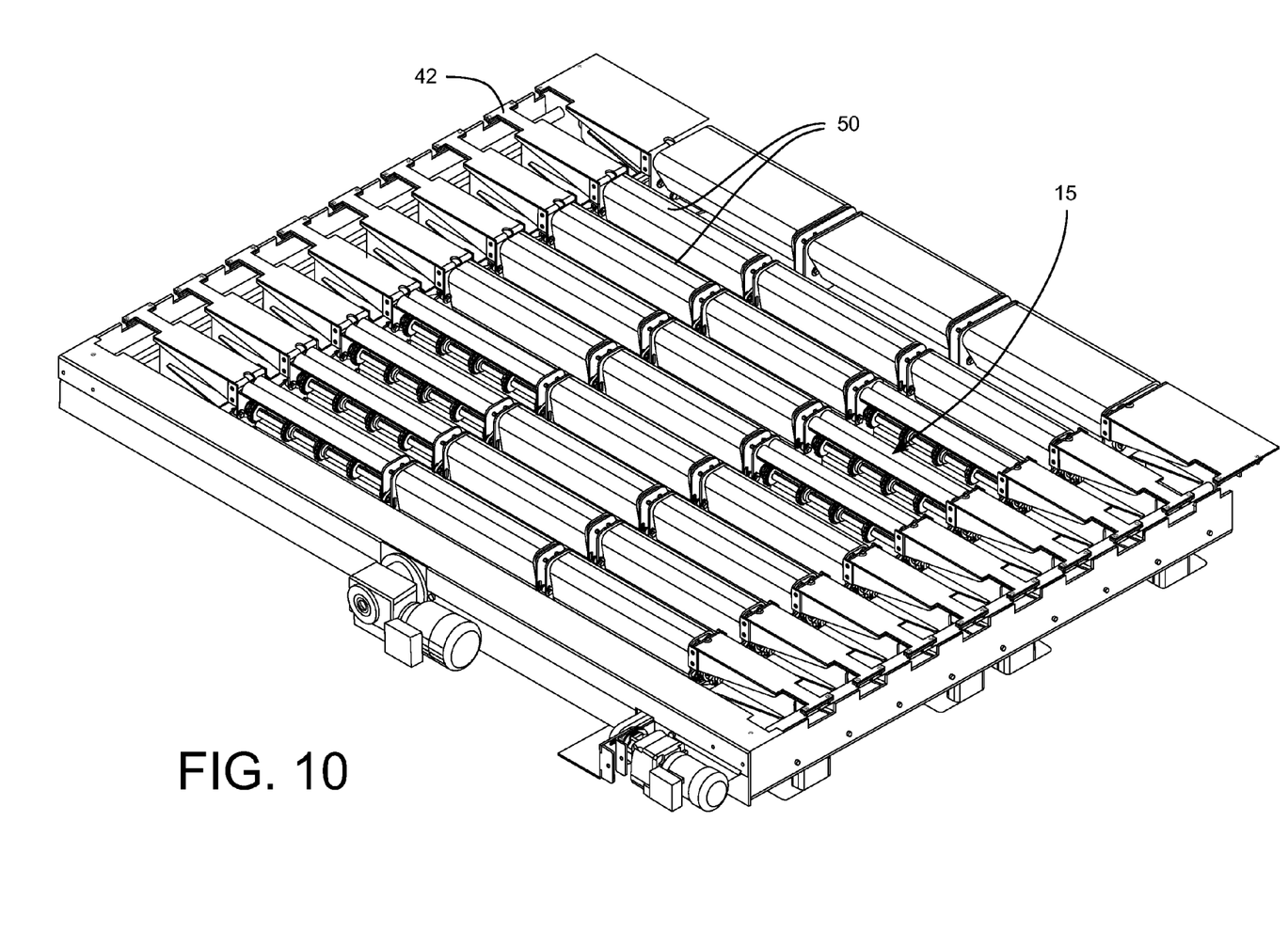
FIG. 10 is a top perspective view of the right angle conveyor section of FIG. 1, shown with the first directional component removed.

In the illustrated embodiment, the second directional component 14 is operable to convey the load at right angles to the direction of the first directional component 12. Thus, the conveyor section 10 provides means for moving the second directional component 14 into engagement with the load when the right angle movement is required. As shown in FIGS. 8-9, a translating device, provided herein as a number of lifters 60, are provided between the frame 20 and the frame 40. The lifters 60 may be configured to move vertically one of the directional components 12, 14 relative the other of the directional components 12, 14. As illustrated, the lifters 60 may comprise pneumatic devices that bear against the flanges 44 to lift the second directional component 14 upward. When all of the lifters 60 are activated the entire second directional component 14 is lifted upward to engage a load on the conveyor section 10. Alternatively, only a selected number of lifters 60 may be activated to lift a corresponding number of roll elements 50. One suitable lifter is an air bag structure fed by pneumatic lines 62 (FIG. 5).

In other embodiments the second directional component 14 may be configured to convey the load in a direction other than at a right angle to the direction of the first directional component 12, as determined by the particular application.

In operation a load or a first portion of a multi-part load is conveyed onto the first directional component 12. Sensors, such as proximity sensors known in the art, may determine when the load is properly positioned over the conveyor section 10 to deactivate the belt elements 30 of the first directional component 12. The roll elements 50 of the second directional component 14 may then be activated to direct the load at right angles to a discharge conveyor. Alternatively, the second directional component 14 may be activated to reposition a multi-part load upon the conveyor section 10. Activation of the second directional component 14 causes all or a portion of the lifters 60 to elevate the second directional component 14 so that its roll elements 50 engage the load. Since the load is being lifted off the first directional component 12, the belt elements 30 for that component 12 need not necessarily be deactivated.

The present system provides the capability of lateral load building for sheet stacks that are smaller than the right angle conveyor section 10. By way of non-limiting example, the sheet stacks may be about one-quarter the size of the staging area 15 or conveyor section 10. Controlled manipulation of the lifters 60 of the second directional component 14, in concert with controlled duration of operation of the first directional component 12, can direct incoming stacks into the four quadrants of the conveyor section 10. In other words, a first incoming stack may be conveyed by the first directional component 12 to the far end of the conveyor section 10 and then shifted laterally by the second directional component 14. The load may be shifted against a lateral stop plate (not illustrated) to help maintain the integrity of the stack. The next incoming stack may be conveyed only part way onto the conveyor section 10 and then moved laterally by the second directional component 14 to occupy a lateral quadrant immediately adjacent the first stack. The lateral stop plate prevents discharge of the previously placed stack. The third sheet stack can be conveyed directly to the far end of the conveyor section 10 and against a forward stop, followed immediately by the final stack conveyed in the same direction onto the nearest quadrant of the conveyor section. The conveyor section 10 may then carry four load stacks that can be ejected from the conveyor section 10 by operating all of the belt elements 30 of the first directional component 12 in unison.

Figure 11:
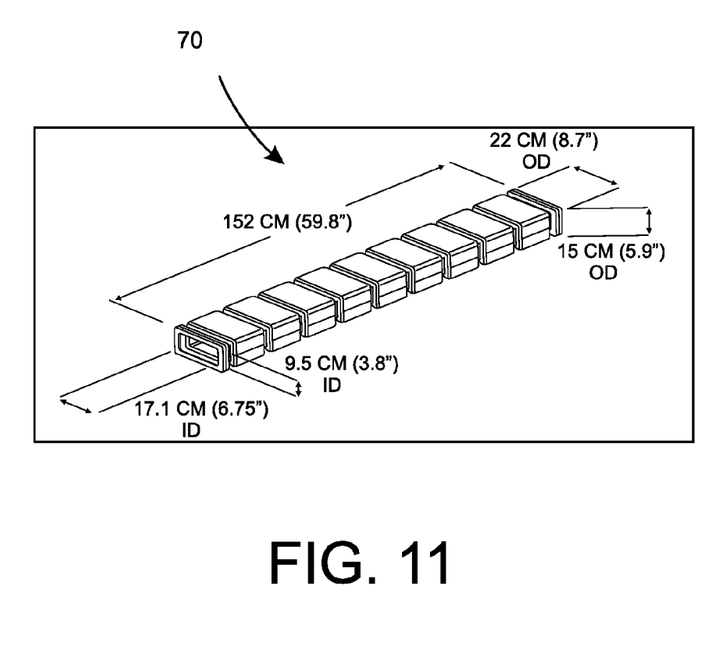
FIG. 11 shows track elements for a second directional component of the right angle conveyor section shown in FIG. 1.
Figure 12:
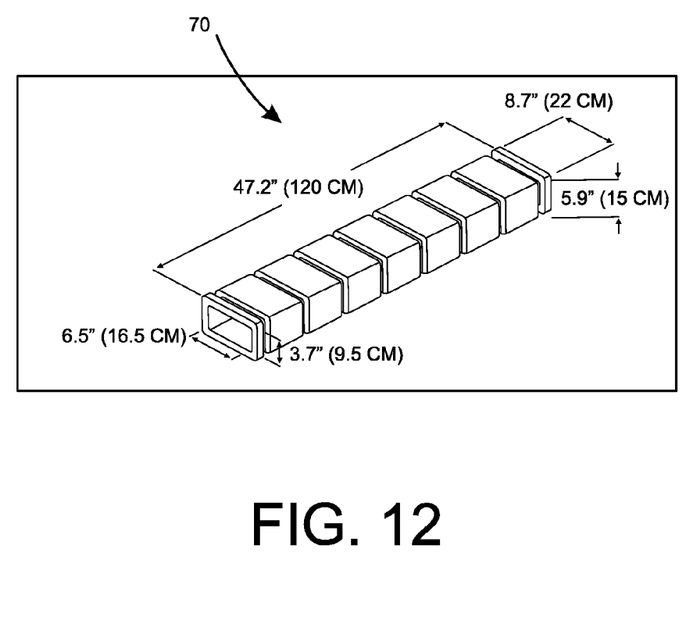
FIG. 12 shows track elements for a second directional component of the right angle convey section shown in FIG. 1.

The first and second directional components 12, 14 may include wide belt conveyors 70, non-limiting exemplary dimension of which are provided in FIGS. 11 and 12. In this embodiment, the first directional component 12 may include only five belt elements 30. A wider space is provided between the first belt elements 30 to permit the use of the heavy duty wide belt conveyors 70 for the second directional component 14.

The modularity of the present system provides significant flexibility in the design of a conveyor section 10. In one variation, the outermost conveyor element can be replaced by a walking platform (not illustrated) that is especially useful in larger scale conveyor systems. The present system is particularly useful for plastic conveyor belt components.

In a further variation, the conveyor section 10 may be sub-divided into several functional sub-sections, each with their own control. Thus, the second directional component 14 may include forward and rear sub-sections that are independently driven and controlled. Likewise, the first directional component 12 may include left and right sub-sections that are also independently driven and controlled.

It is contemplated that the operation of the components of the present system are controlled electrically, electronically, or by software. In other words, the sequence of movements described above may be pre-programmed into a controller linked to each component to control the activation of each component to build or break apart a load in a desired manner. The system control can be activated when a load is detected adjacent the staging area 15, or may be integrated into a complex conveyor system and operated according to a global control protocol.

While the invention has been illustrated and described in detail in the drawings and foregoing description, the same should be considered as illustrative and not restrictive in character. It is understood that only the preferred embodiments have been presented and that all changes, modifications, and further applications that come within the spirit of the invention are desired to be protected.

What is claimed is:

1. A load moving apparatus comprising:
   a first conveyor coupled to a frame and configured to define a staging area, the first conveyor configured to move a load in a first direction;
   a second conveyor within the staging area and configured to move the load in a second direction different from the first direction; and
   a translating device configured to move vertically one of the first conveyor and the second conveyor relative to the other of the first conveyor and the second conveyor;
   wherein the first conveyor includes a plurality of moving elements coupled to the frame, the plurality of moving elements separated by a plurality of slots; and
   wherein the second conveyor includes a plurality of moving elements coupled to the frame and positioned in the slots between the moving elements of the first conveyor, the plurality of moving elements of the second conveyor further including:
      at least one endless belt coupled to a source of rotation, the endless belt having a load engaging surface configured to extend across a width of the slot; and
      at least one idler roller having a load engaging surface, wherein the length of the load engaging surface of the idler roller and the length of the load engaging surface of the endless belt are each less than a length of the moving elements of said first conveyor.

2. The load moving apparatus of claim 1, the translating device comprising:
   a plurality of lifters configured to move a plurality of load engaging surfaces of the moving elements of the second conveyor between a first position and a second position, in the first position the plurality of load engaging surfaces of the moving elements of the second conveyor are configured to be positioned below a plurality of load engaging surfaces of the moving elements of the first conveyor, and in a second position the plurality of load engaging surfaces of the moving elements of the second conveyor are configured to be positioned above the plurality of load engaging surfaces of the moving elements of the first conveyor.

3. The load moving apparatus of claim 2, wherein the plurality of lifters are a plurality of pneumatic lifting elements coupled to the moving elements of the second conveyor.

4. The load moving apparatus of claim 2, wherein the plurality of load engaging surfaces of the moving elements of the second conveyor are individually movable between the first position and the second position.

5. The load moving apparatus of claim 1, the moving elements of the first conveyor comprising:
   an endless belt having a load engaging surface configured to extend across a length of the staging area.

6. The load moving apparatus of claim 1, further comprising:
   a first motor rotatably coupled to the plurality of moving elements of the first conveyor, the first motor being configured to individually activate selected moving elements of the first conveyor; and
   a second motor rotatably coupled to the plurality of moving elements of the second conveyor, the second motor being configured to individually activate selected moving elements of the second conveyor.

7. The load moving apparatus of claim 1, wherein the moving elements of the first conveyor and the moving elements of the second conveyor are modularly coupled to the frame.

8. A method of moving and arranging a load, comprising:
   activating a first conveyor to move a first portion of a load in a first direction onto a staging area, the load being arranged initially in a first configuration;
   activating a second conveyor to elevate the first portion of the load above the load engaging surface of the first conveyor and to subsequently move the first portion of the load in a second direction on the staging area, the second direction being perpendicular to the first direction;
   activating the first conveyor to move a second portion of the load in the first direction onto the staging area; and
   activating one of the first conveyor and the second conveyor to move the first portion of the load and the second portion of the load off the staging area, the load being arranged in a second configuration.

9. The method of moving and arranging a load of claim 8, wherein
- a frame defines a plurality of first slots and a plurality of second slots interlaced with the plurality of first slots, the first and second slots having a length equal to the length of the staging area;
- the first conveyor is provided as a plurality of moving elements coupled to the frame and positioned in the first slots; and
- the second conveyor is provided as a plurality of moving elements coupled to the frame and positioned in the second slots.

10. The method of moving and arranging a load of claim 9, moving the load with the second conveyor comprising:
- lifting the plurality of moving elements of the second conveyor above a load engaging surface of the moving elements of the first conveyor.

11. The method of moving and arranging a load of claim 9, activating the first conveyor to move a second portion of the load comprising:
- lifting the first portion of the load above a load engaging surface of the moving elements of the first conveyor with a first group of moving of elements of the second conveyor;
- lowering a second group of moving elements of the second conveyor below the load engaging surface of the moving elements of the first conveyor;
- activating the moving elements of the first conveyor to move the second portion of the load onto the staging area above the second group of moving elements of the second conveyor.

12. The method of moving and arranging a load of claim 9, further comprising:
- determining a load width; and
- coupling a plurality of moving elements of the first conveyor and a plurality of moving elements of the second conveyor to the frame, the plurality of moving elements of the first conveyor and the plurality of moving elements of the second conveyor having a total width at least equal to the load width.

13. A method of moving and arranging a load, comprising:
- activating a first conveyor to move a load in a first direction onto a staging area, the load being arranged initially in a first configuration;
- lifting a first portion of the load above a load engaging surface of the first conveyor with a lifting device coupled to a second conveyor;
- activating the first conveyor to move a second portion of the load in the first direction off the staging area;
- activating the second conveyor to move the first portion of the load in a second direction; and
- activating the first conveyor to move the first portion of the load in the first direction off the staging area behind the second portion of the load, the load being arranged in a second configuration.

14. The method of moving and arranging a load of claim 13, wherein
- a frame defines a plurality of first slots and a plurality of second slots interlaced with the plurality of first slots, the first and second slots having a length equal to the length of the staging area;
- the first conveyor is provided as a plurality of moving elements coupled to the frame and positioned in the first slots; and
- the second conveyor is provided as a plurality of moving elements coupled to the frame and positioned in the second slots.

15. A load moving apparatus comprising:
- a first conveyor including a plurality of moving elements separated by a plurality of slots, wherein the first conveyor is coupled to a frame and configured to define a staging area, the first conveyor configured to move a load in a first direction;
- a second conveyor, including a plurality of moving elements coupled to the frame and positioned in the slots between the moving elements of the first conveyor, the second conveyor configured to move the load in a second direction different from the first direction;
- a translating device configured to move vertically one of the first conveyor and the second conveyor relative to the other of the first conveyor and the second conveyor;
- a first motor rotatably coupled to the plurality of moving elements of the first conveyor, the first motor being configured to individually activate selected moving elements of the first conveyor; and
- a second motor rotatably coupled to the plurality of moving elements of the second conveyor, the second motor being configured to individually activate selected moving elements of the second conveyor.

16. The load moving apparatus of claim 15, the moving elements of the second conveyor including an endless belt coupled to the second motor, the endless belt having a load engaging surface configured to extend across a width of the slot.

17. The load moving apparatus of claim 15, the translating device including a plurality of lifters configured to move a plurality of load engaging surfaces of the moving elements of the second conveyor between a first position and a second position, in the first position the plurality of load engaging surfaces of the moving elements of the second conveyor are configured to be positioned below a plurality of load engaging surfaces of the moving elements of the first conveyor, and in a second position the plurality of load engaging surfaces of the moving elements of the second conveyor are configured to be positioned above the plurality of load engaging surfaces of the moving elements of the first conveyor.

18. The load moving apparatus of claim 17, wherein the plurality of lifters are a plurality of pneumatic lifting elements coupled to the moving elements of the second conveyor.

19. The load moving apparatus of claim 17, wherein the plurality of load engaging surfaces of the moving elements of the second conveyor are individually movable between the first position and the second position.

20. The load moving apparatus of claim 15, the moving elements of the first conveyor including an endless belt having a load engaging surface configured to extend across a length of the staging area.

21. The load moving apparatus of claim 15, wherein the moving elements of the first conveyor and the moving elements of the second conveyor are modularly coupled to the frame.

* * * * *